(12) United States Patent
Morris et al.

(10) Patent No.: US 8,244,721 B2
(45) Date of Patent: Aug. 14, 2012

(54) USING RELATED USERS DATA TO ENHANCE WEB SEARCH

(75) Inventors: Meredith June Morris, Bellevue, WA (US); Jaime Brooks Teevan, Cambridge, MA (US); James W. Mickens, Ann Arbor, MI (US); Saleema Amershi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 747 days.

(21) Appl. No.: 12/030,331

(22) Filed: Feb. 13, 2008

(65) Prior Publication Data

US 2009/0204599 A1    Aug. 13, 2009

(51) Int. Cl.
*G06F 17/30* (2006.01)
(52) U.S. Cl. ............... 707/723; 707/802; 715/753
(58) Field of Classification Search ........... 707/732, 707/721, 722, 723, 802; 715/753
See application file for complete search history.

(56) References Cited

U.S. PATENT DOCUMENTS

| | | | |
|---|---|---|---|
| 6,327,590 B1 | 12/2001 | Chidlovskii et al. | |
| 6,947,924 B2 | 9/2005 | Bates et al. | |
| 7,024,404 B1 | 4/2006 | Gerasoulis et al. | |
| 2003/0217052 A1 | 11/2003 | Rubenczyk et al. | |
| 2005/0071328 A1* | 3/2005 | Lawrence | 707/3 |
| 2006/0026152 A1 | 2/2006 | Zeng et al. | |
| 2006/0036598 A1 | 2/2006 | Wu | |
| 2006/0095430 A1 | 5/2006 | Zeng et al. | |
| 2007/0174257 A1 | 7/2007 | Howard | |
| 2007/0233671 A1 | 10/2007 | Oztekin et al. | |
| 2007/0294225 A1 | 12/2007 | Radlinski et al. | |
| 2009/0198854 A1* | 8/2009 | Rofougaran et al. | 710/303 |

FOREIGN PATENT DOCUMENTS

| | | |
|---|---|---|
| CN | 101019118 | 8/2007 |
| EP | 1050830 | 11/2000 |

OTHER PUBLICATIONS

Leake, et al., "Aiding Knowledge Capture by Searching for Extensions of Knowledge Models", Proceedings of the Second International Conference on Knowledge Capture, K-CAP, Oct. 2003, Florida, USA.

White, et al., "Studying the Use of Popular Destinations to Enhance Web Search Interaction", Proceedings of teh 30th International Conference on Research and Development in Information Retrieval, SIGIR, Jul. 2007, Amsterdam, The Netherlands, pp. 159-166.

(Continued)

*Primary Examiner* — Shahid Alam
(74) *Attorney, Agent, or Firm* — Lee & Hayes, PLLC

(57) ABSTRACT

The claimed subject matter provides a system and/or a method that facilitates generating a personalized query result for a specific user. An interface can receive at least one of a portion of a text query to be searched or a portion of personalized content related to a user that submits the portion of the text query. A personalization component can combine the portion of personalized content related to the user with a portion of personalized content related to one or more disparate users to create group personalized content, wherein the group personalized content is compared with the portion of the text query to identify a relationship there between to generate a personalized query result in accordance with the relationship.

20 Claims, 10 Drawing Sheets

OTHER PUBLICATIONS

Shady Elbassuoni, et al. Adaptive Personalization of Web Search. 1st Workshop on Web Information-Seeking and Interaction '07 Amsterdam, The Netherlands. http://www.mpi-inf.mpg.de/~elbass/downloads/elbasswisi2007.pdf. Last accessed Nov. 16, 2007, 4 pages.

Jaime Teevan, et al. Beyond the Commons: Investigating the Value of Personalizing Web Search http://research.microsoft.com/~sdumais/PIA2005-final.pdf. Last accessed Nov. 16, 2007, 9 pages.

Wen-Chih Peng Wen-Chin Peng, et al. Ranking Web Search Results from Personalized Perspective. Proceedings of the 8th IEEE International Conference on E-Commerce Technology and the 3rd IEEE International Conference on Enterprise Computing, E-Commerce, and E-Services (CEC/EEE'06), 0-7695-2511-3/06, IEEE. http://ieeexplore.ieee.org/iel5/10920/34369/01640267.pdf?isnumber=34369&prod=CNF&arnumber=1640267&arSt=12&ared=12&arAuthor=Wen-Chih+Pen%3B+Yu-Chin+Lin.

Morris, M.R. and Horvitz, E. SearchTogether: An Interface for Collaborative Web Search. Proceedings of UIST 2007.

Teevan, J. Supporting Finding and Re-Finding Through Personalization. Doctoral thesis, Massachusetts Institute of Technology, 2006.

Chinese Office Action mailed Feb. 28, 2012 for Chinese patent application No. 200880126908.X, a counterpart foreign application of U.S. Appl. No. 12/030,331, 10 pages.

Extended European Search Report mailed Feburary 24, 2012 for European patent application No. 08872403.4, 6 pages.

* cited by examiner

USING RELATED USERS DATA TO ENHANCE WEB SEARCH

BACKGROUND

In many instances, a search engine is utilized to search for information. In general, a search engine is a special program (e.g., computer executable instructions) designed to help find files (e.g., web pages, images, text . . . ) stored on a computer, for example, a public server or on one's own personal computer. A typical search engine allows a user to invoke a query for files that satisfy particular criteria, for example, files that contain a given word or phrase in a title or body. Web search engines generally work by storing information about a large number of web pages retrieved from the World Wide Web (WWW) through a web crawler, or an automated web browser, which follows essentially every link it locates. The contents of each web page are then analyzed to determine how it should be indexed, for example, words can be extracted from the titles, headings, or special fields called meta-tags. Data about web pages is stored in an index database for use in later queries. Some search engines store (or cache) all or part of a source page as well as information about the web pages. When a user invokes a query through the web search engine by providing key words, the web search engine looks up the index and provides a listing of web pages that best-match the criteria, usually with a short summary containing the document's title and/or parts of the text.

In general, the usefulness of a search engine depends on the relevance of the results it presents to a user and the presentation of such results. While there can be numerous web pages that include a particular word or phrase, some web pages may be more relevant, popular, or authoritative than others. Most search engines employ methods to rank the results to provide a "best" result first. How a search engine decides which pages are the best matches, and what order the results should be shown in, varies widely from one engine to another. Conventionally, the technique for displaying what the search engine considers relevant information about a web page to a user can be based on a static ranking and a dynamic ranking. In other words, query results are traditionally ranked based on static information pertaining to the quality of the result (such as the number of links and the traffic associated with such links), and dynamic information pertaining to the result's relevance to the query (such as the number of times the query term occurs in the result). Thus, a particular web page that does not mention the query term can be ranked very high because a link within such web page has a relatively high amount of traffic. Specifically, a static ranking can involve seeing how many other web pages link to a web page as well as the density of matches to the search term on the page. Dynamic ranking can involve the frequency of the query term in the document or ranking a page slightly higher every time a user clicks on that link after it appears in search results for that query.

Typically, Internet search results are sifted and browsed in order to identify relevant or applicable information. For example, a search with particular terms on a search engine can yield specific results in which one result may be important and satisfy a first user, whereas a disparate result may be important and satisfy a second user. Current research on the "personalization" of search results attempts to enhance the Web search experience by utilizing an individual's data (e.g., index of content on a machine, past web visitation, query histories, etc.) in order to customize search results. For instance, search results can be re-ranked so that results similar to documents on a user's machine are ranked more highly. Additionally, web search results can be re-ranked so results that an individual has visited in the past are ranked more highly. In general, personalization of web search results can prove to be a vital factor in a user's Internet browsing experience.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate enhancing web search results by combining a user's personal content with one or more related users' content to produce personalized results. A personalization component can provide enhanced query results particular to a user based on evaluating personalized content from the user and a group membership. The group membership can be based explicit (based, for example, on similar demographics, job role, or explicit interests) or implicit (based, for example on having relevant data or having issued similar queries). Thus, the group membership can be based upon having relevant data or upon having common interests, tasks, or other relationships among the group members. In general, interests, relationships, or substantially similar correlations can be identified by analyzing a portion of personalized content associated with a user and/or fellow group members. Thus, web personalization efforts are enhanced by combining an individual's data with that of other related people.

In accordance with one aspect of the subject innovation, the personalization component can leverage the group to provide relevant search results for a particular member of the group. The personalization component can provide a groupized ranking (e.g., generating individual personalization scores of relevancy for each group member and each search result and summing each personalization scores for a group score), a smart splitting technique (e.g., distribution of search query results to members of the group for parallel evaluation), and/or a group query expansion (e.g., broadening the search query by evaluating related search queries from members of the group). In other aspects of the claimed subject matter, methods are provided that facilitate implementing a shared web task to enhance personalization of web search results.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
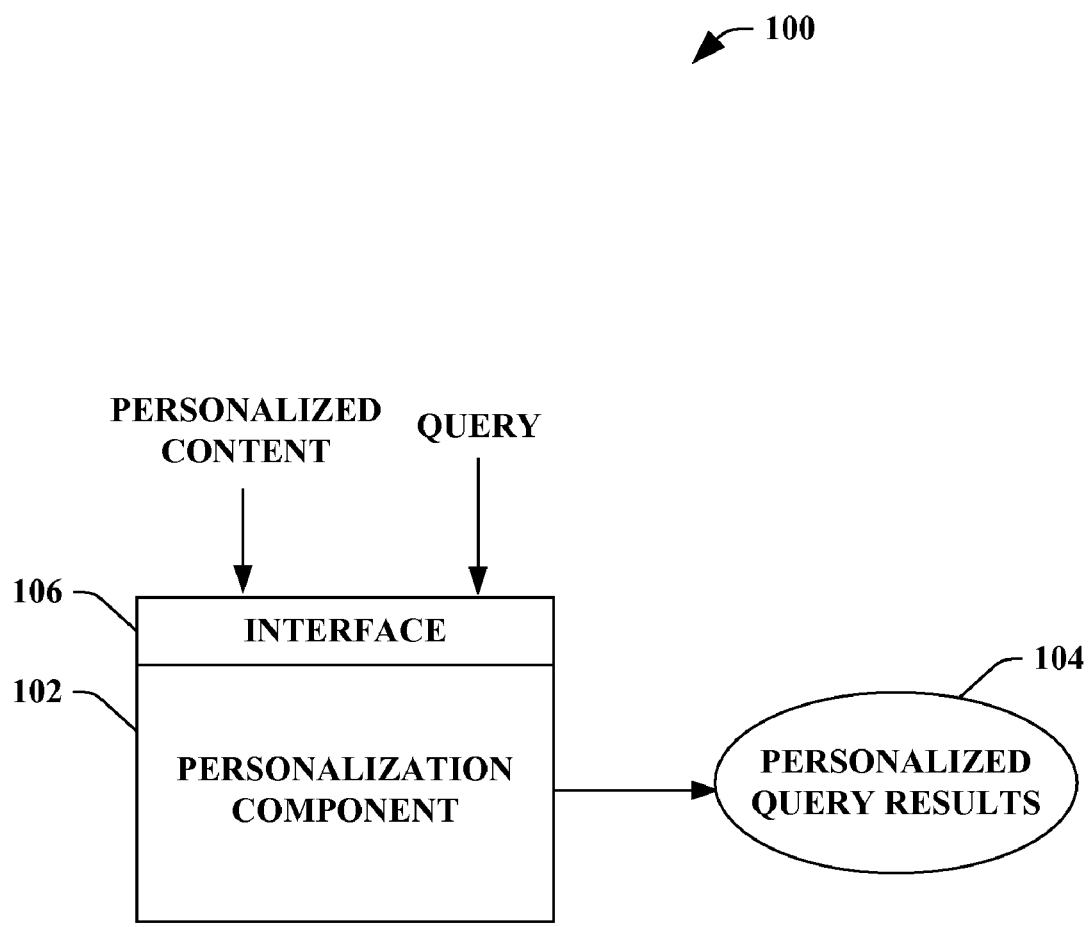
FIG. 1 illustrates a block diagram of an exemplary system that facilitates enhancing web search results by combining a user's personalized content with one or more related user's content to produce personalized results.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "engine," "store," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates enhancing web search results by combining a user's personal content with one or more related users' content to produce personalized results. The system 100 can include a personalization component 102 that can generate personalized query results 104 based upon a query and personalized content related to two or more users received via an interface component 106 (e.g., discussed in more detail below). In general, the personalization component 102 can collect user specific data for two or more users, wherein such combined group specific data can be leveraged in order to identify more relevant search results (e.g., personalized query results 104). Thus, two or more users with related personal content or data can be utilized to participate in a shared web search task to yield personalized query results 104.

For instance, a group of users can provide shared backgrounds or interests that can be leveraged to identify personalized search results for individual members of such group. In one example, a group of users can based on any suitable criteria or characteristic such as, but not limited to, professional data (e.g., work experience, employment, credentials, etc.), geographic data (e.g., residency, location, etc.), personal information (e.g., name, age, heritage, tax bracket, etc.), consumer data (e.g., property owned, electronic devices utilized, money produced, money spent, etc.), organizational data (e.g., membership, duration of membership, etc.), browsed data (e.g., website visitation, images viewed, media utilized, etc.), personal interests (e.g., likes, dislikes, etc.), and/or any other information that can be utilized to categorize or group two or more individuals. Thus, a group of members with related interests or backgrounds can be utilized to identify a more accurate search result for a member of the group.

In an example, a user can participate in collaborate web search with a group of users who have an interest in a particular content (e.g., item, good, service, etc.). By utilizing the group members and respective correlating interests, more accurate and relevant search results can be provided for each of the group members. In one specific example, a ranking or score for each group member can be calculated, wherein the score or ranking reflects relevancy for each member's interests. An average of this score or ranking can be calculated for the group members in which search results can be sorted or filtered upon. Thus, the group members are leveraged to identify an average ranking for search results. In another example, the members of the group can be utilized to provide a collaborative search in which a first member of the group provides a query and disparate members of the group provide parallel evaluation of the search results. In still another example, a group member query can be expanded by including related queries issued by other members of the group. In general, utilizing a group of members with correlating interests or personalized content can optimally enhance searching and/or querying data.

In addition, the system 100 can include any suitable and/or necessary interface component 106 (herein referred to as "interface 106"), which provides various adapters, connectors, channels, communication paths, etc. to integrate the personalization component 102 into virtually any operating and/or database system(s) and/or with one another. In addition, the interface 106 can provide various adapters, connectors, channels, communication paths, etc., that provide for interaction with the personalization component 102, personalized query results 104, personalized content, users, search engine (not shown), and any other device and/or component associated with the system 100.

Figure 2:
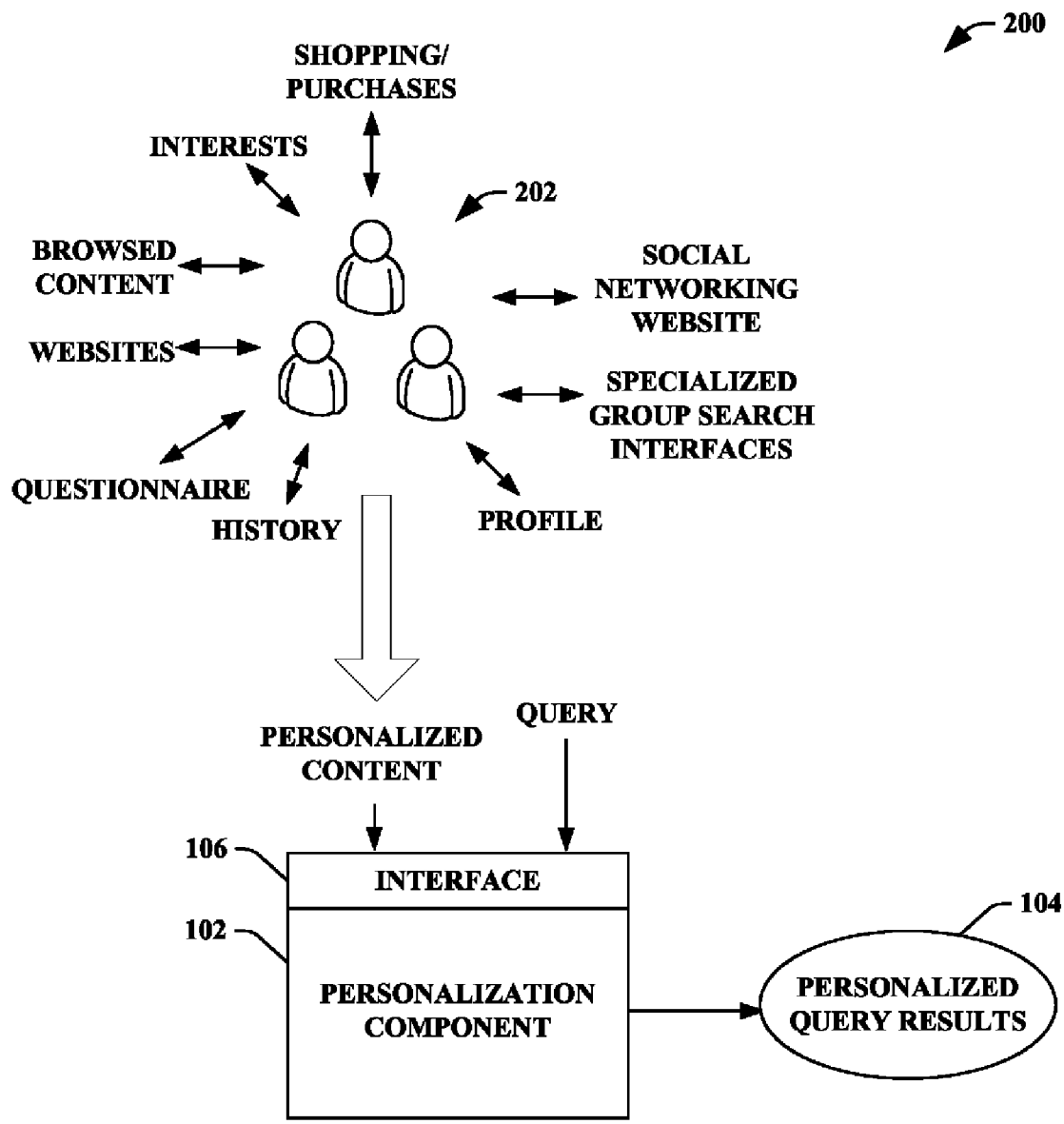
FIG. 2 illustrates a block diagram of an exemplary system that facilitates identifying a group of users with related personalized content to enable the generation of personalized web search results.

FIG. 2 illustrates a system 200 that facilitates identifying a group of users with related personal content to enable the generation of personalized web search results. The personalization component 102 associated with the system 200 can optimize search result relevancy for a user based on evaluating disparate users that belong to a group in which membership identifies a relation or correlation in personalized content. For example, a query from a first user can be received via the interface 106, wherein the personalization component 102 can leverage a group (e.g., in which the first user is a member and shares an interest) to contribute to identifying or filtering search results. Thus, by utilizing the group of the first user and the correlating interests, personalized query results 104 can be provided by the personalization component 102.

As discussed, the personalization component 102 can receive personalized content associated with a user and/or a group including two or more users. A group of users 202 can be created based upon an automatic evaluation of each individual's personalized content. In another example, the group of users 202 can be created based on each user joining such group based on personal interest or identification with a common, similar, or related interest. For instance, a first user can create a group associated with a particular video game and additional users can join such group in light of having an interest in such video game. Upon creation of the group of users 202, personalized query results 104 can be provided by leveraging such grouping. Within each group, the personalized content for each member can be evaluated and/or utilized to enhance efficiency of providing personalized query results 104 for a member of such group. It is to be appreciated that the personalized content can be, but is not limited to being, interests, browsed content or data, history (e.g., Internet history, pages viewed, data accessed, etc.), profile (e.g., user profile, settings, etc.), websites, questionnaire (e.g., detailed questions, specific information request, etc.), shopping, purchases, social networking website data, specialized group search interfaces and/or data related thereto, and/or any other suitable data that can identify personalized preferences or interests.

For example, the personalization component 102 can implement a groupized ranking. For each search result in the top N results (e.g., wherein N is a positive integer) that are returned by a query, a personalization score can be calculated for each person in the group. The "group" score can be calculated for each result as a sum of each group member's personalization score, or it can be calculated by calculating the personalization score using aggregate information about the group in place of information about one individual. The result list can be re-ranked such that results with the highest group scores come first, and this re-ranked list can be shown to the group member who performed the search. This groupized ranking can have the effect of further enhancing personalized query results 104 by highly ranking items that are relevant to multiple group members. In other words, a search result that is of interest based on an average of the group members can be more highly ranked. Results that are both relevant to the individual and to the group can be identified using a weighted combination of the individual's personal score and the group score. In this case, results that are of interest to the average group members but also of particular interest to the group member performing the search can be highly ranked.

In an additional example, the personalization component 102 can utilize smart splitting. A collaborative web search tool can enable a group of people who are online to collaborate by conducting a split search, wherein one group member can enter a query and non-overlapping subsets of the search results for that query can be sent to each member of the group to enable parallel evaluation. Naïve splitting algorithms can be enhanced by a smart splitting process that can distribute the results so that group members receive the most personally relevant results. In one instance, this can be implemented by taking the top M results (e.g., where M is a positive integer) for the query, calculating the personalized score for each result for each group member, re-ranking the results list for each group member based on their personalized score (e.g., highest first), then creating a final split lists by, in a round-robin fashion, assigning to each group member the top-ranked result on their personalized list that has not yet been assigned to another group member, until all results have been assigned to a user.

Furthermore, the personalization component 102 can enable group query expansion. Users often issue several queries related to a single task. These queries could be automatically inferred as having a relationship based on semantic content, the time span on within which they were issued, and/or being manually inferred as having a relationship based on the use of collaborative search tools (e.g., organizing sets of queries into manually defined task sessions, etc.). These sets of related queries could be further expanded by including the related queries issued by other group members (e.g., others who were using a collaborative search tool in a substantially similar task session, etc.) or by finding other people in Web usage logs who have issued similar queries and using those users' stored sets of related queries. Moreover, the personalized component 102 can expand queries by finding other people who have similar backgrounds as defined by similarity of past queries, past webpage visits, computer index contents, etc.

Figure 3:
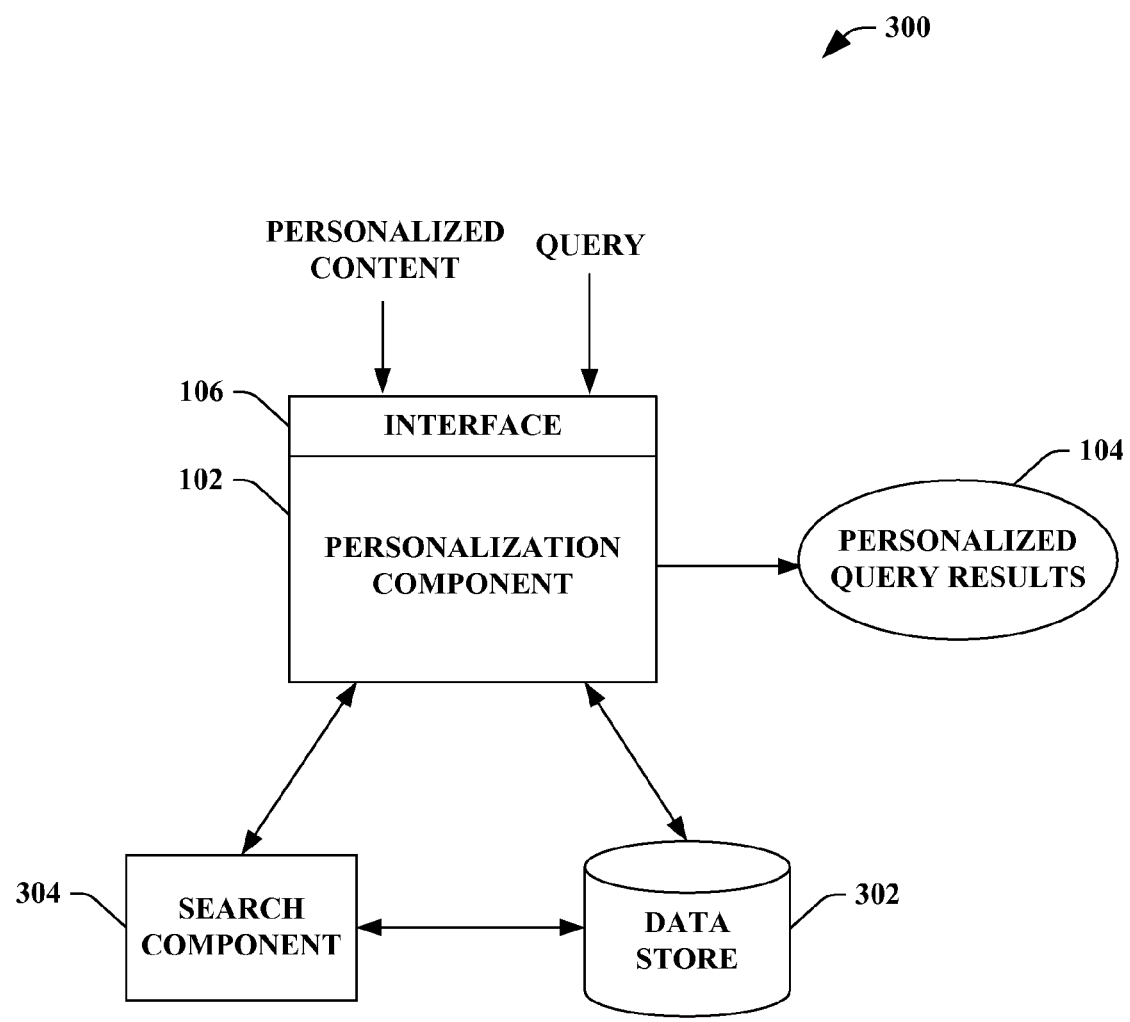
FIG. 3 illustrates a block diagram of an exemplary system that facilitates optimizing personalized web search results with a search engine based on combining user specific content with related group members.

FIG. 3 illustrates a system 300 that facilitates optimizing personalized web search results with a search engine based on combining user specific content with related group members. The system 300 can include the personalization component 102 that can enhance personalization of receiving search results on the Internet by combining an individual's data with that of other related people or users. Specifically, the personalization component 102 can identify relevant personalized query results 104 by evaluating personalized content of each user belonging to a group. For example, a user can join or participate in a group to which a common, similar, or related interest exists. In another example, a user can be automatically assigned to a group based on analysis and matching of personalized content (e.g., history, browsed content, profile, websites, questionnaire, interests, shopping, purchases, desktop content, etc.). It is to be appreciated that the personalization component 102 can provide group assigned by any suitable manner such as, but not limited to, user-defined group assignment, automatic assignment based on evaluation of group and/or user personalized data, and/or any suitable combination thereof (e.g., automatic assignment and manual edit to automatic settings/assignments, etc.).

The system 300 can further include a data store 302 that can include any suitable data related to the personalization component 102, the personalized query results 104, and the interface 106. For instance, the data store can include group membership definitions, group membership data, personalized content, user interests, user settings, user queries, group queries, user privacy settings (e.g., personalized content exposure, etc.), user profiles, web history, browsed data, group settings (e.g., group participation, rankings of members, relevancy of grouping, etc.), groupized ranking data (e.g., formulas for calculating scores or rankings for group members, formulas for identifying averaged scores or rankings for group, etc.), smart splitting data (e.g., collaboration settings, group member parallel evaluation assignments, etc.), highlighting settings (e.g., emphasis settings, colors, fonts, user defined emphasis details, etc.), group query expansion data (e.g., user specific query expansion settings, query expansion correlation definition, etc.), any suitable data related to querying data, any suitable data related to providing search results based on evaluation of at least one member of a group, etc. It is to be appreciated that the data store 302 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 302 of the subject systems and methods is intended to comprise, without being limited to, these and any other suitable types of memory. In addition, it is to be appreciated that the data store 302 can be a server, a database, a hard drive, and the like.

The personalization component 102 can further utilize a search component 304 that facilitates querying data. In one instance, the search component 304 can receive a query and provide query results based at least in part upon the received query, wherein the personalization component 102 can filter such query results based on a group membership and respective personalized interests of such members. In another instance, the search component 304 can be utilized as a shared search engine to provide collaborative searching for members of a particular group, wherein membership can be based on a related interest, personal content, and the like. In other words, the personalization component 102 can filter query results provided by the search component 304 in accordance with individual members from a group with a correlating interest.

Figure 4:
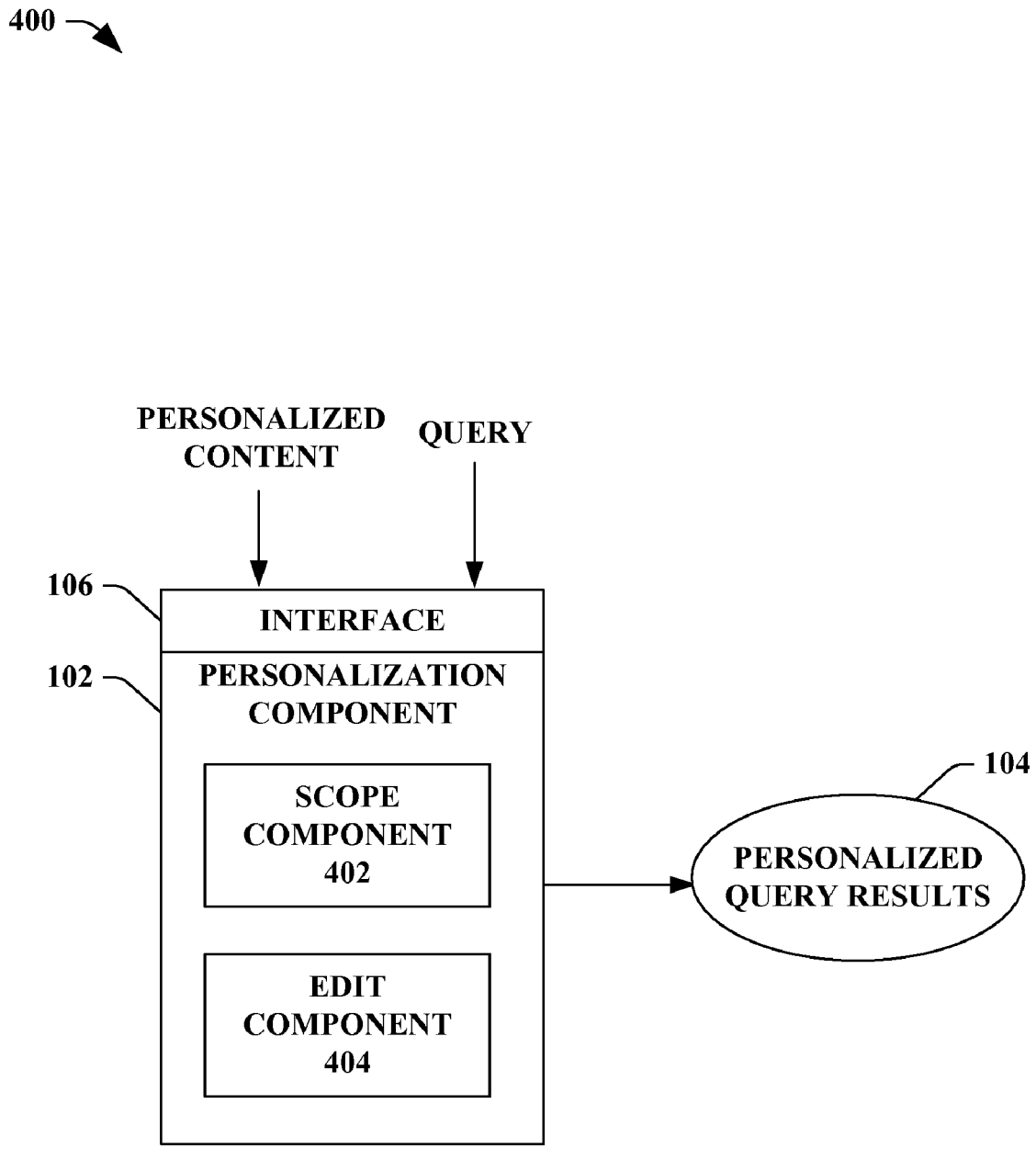
FIG. 4 illustrates a block diagram of an exemplary system that facilitates defining group personalized web search options to provide tailored search results.

FIG. 4 illustrates a system 400 that facilitates defining group personalized web search options to provide tailored search results. The system 400 can include the personalization component 102 that can utilize a group of users having a relation or common interest (e.g., related personalized content, etc.) to provide query results 104 that are more personalized for a user that submits a query. The personalization component 102 can implement a scope component 402 to allow specific tailoring to group evaluation settings and/or details. For example, the scope component 402 can allow a user to define which particular relationships or interests can be considered for group assignment. Moreover, the scope component 402 can enable a user to define a confidence ranking for interests or personalized content with group members. Thus, a user can specifically define a level of confidence or commonality for group members with a confidence ranking which can further assist in identifying search results for a user.

Moreover, the personalization component 102 can employ an edit component 404 which enables a user to define security settings in relation to personalized content. For example, a user can allow or disallow exposure of personalized content utilized to identify a group and/or identify a personalized query result. For example, a portion of website history may be removed from consideration for identification of search results or group membership. Thus, a user can manually edit the information related to personalized content. In addition, the edit component 404 can allow various levels of granularity. For instance, a user can expose or allow a portion of personalized content to a first group or user and disallow the portion of personalized content to a second group or user.

Figure 5:
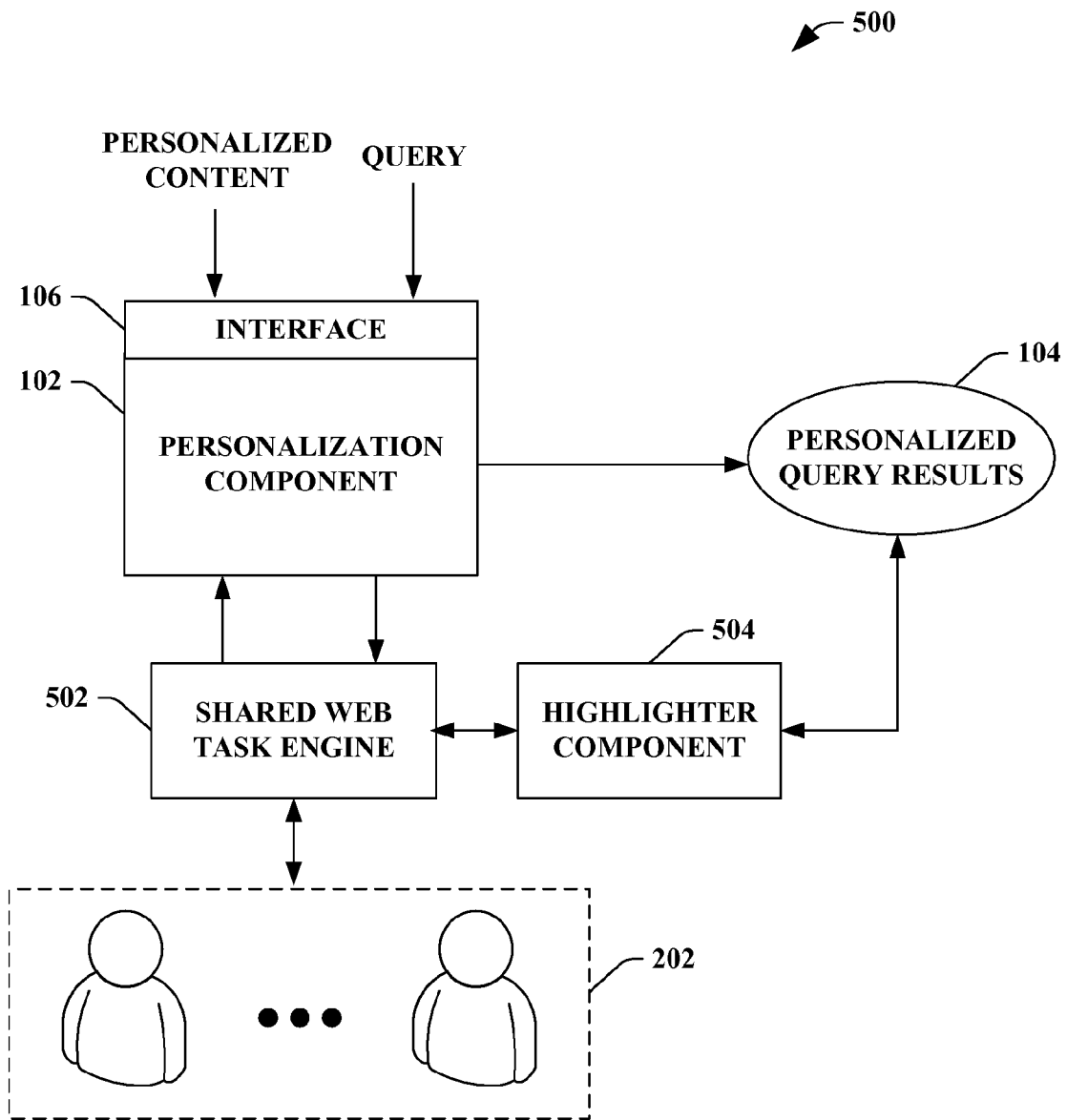
FIG. 5 illustrates a block diagram of exemplary system that facilitates implementing a shared web task to enhance personalization of web search results.

FIG. 5 illustrates a system 500 that facilities implementing a shared web task to enhance personalization of web search results. The system 500 can include the personalization component 102 that can receive a query from a user via an interface 106 in which personalized query results 104 can be generated based on evaluation of the personalized content from the user and disparate users to which share a group membership reflective of related interests and/or personalized content. For instance, a user can participate in a group or be assigned to a group in light of substantial similarities between personalized content (e.g., browsing history, visited websites, interests, questionnaire, profile, browsed content, accessed data, etc.). By leveraging a group of users in combination with the particular user that provided the query, personalized query results 104 can be identified in a more efficient manner.

A shared web task engine 502 can be utilized in order to facilitate leveraging of group members to enhance personalization efforts. In general, the shared web task engine 502 can allow two or more users (e.g., the group of users 202) to collaborate and/or share a web search task. It is to be appreciated that the shared web task engine 502 can be any suitable collaborative web search tool. In particular, the shared web task engine 502 can be utilized to provide smart splitting (as discussed above) in which search results can be distributed to group members 202 for parallel evaluation for relevancy. In addition, the shared web task engine 502 can enable group query expansion in which task sessions and/or related queries from group members can be accessed in order to expand a submitted query (e.g., as discussed above).

The system 500 can further include a highlighter component 504 that can employ emphasis techniques to terms or related queries utilized from the group query expansion technique. In general, the highlighter component 504 can perform group hit highlighting by highlighting queries (e.g., by highlighting query terms from a set of related queries when appeared in a search results list such as in the title, URL, snippet, etc.) from a set of related queries whether they originated with the individual or others in the group from the group query expansion. It is to be appreciated that the highlighter component 504 can provide emphasis to titles, URLs, snippets, etc. in any suitable form such as, but not limited to, a text highlight (e.g., any suitable color, any suitable size, etc.), a magnification, a font, a bold, an underline, a pop-up, a portion of a graphic, and or any other suitable technique that can draw attention to a portion of a search result. Moreover, the highlighter component 504 can allow a particular emphasis technique for each member of a group. Thus, a term associated with a query from user A can have a first emphasis technique (e.g., highlight in color red) and a term associated with a query from user B can have a second emphasis technique (e.g., highlight in color blue).

Results that have many items highlighted can therefore draw a user's attention more, as they might be a match for many items in the set of related query keywords. Additionally, the set of related keywords can be used to automatically expand a users' query (e.g., such as through the use of a "prefer" operator, etc.) in order to assist a search engine (not shown) in returning more appropriate results. It is to be appreciated that the highlighter component 504 can provide any user interface features such as how group hit highlighting is presented to users (e.g., different colors to distinguish among current query keywords, keywords drawn from individual's own set of task-related queries, keywords drawn from other group members, etc.).

Figure 6:
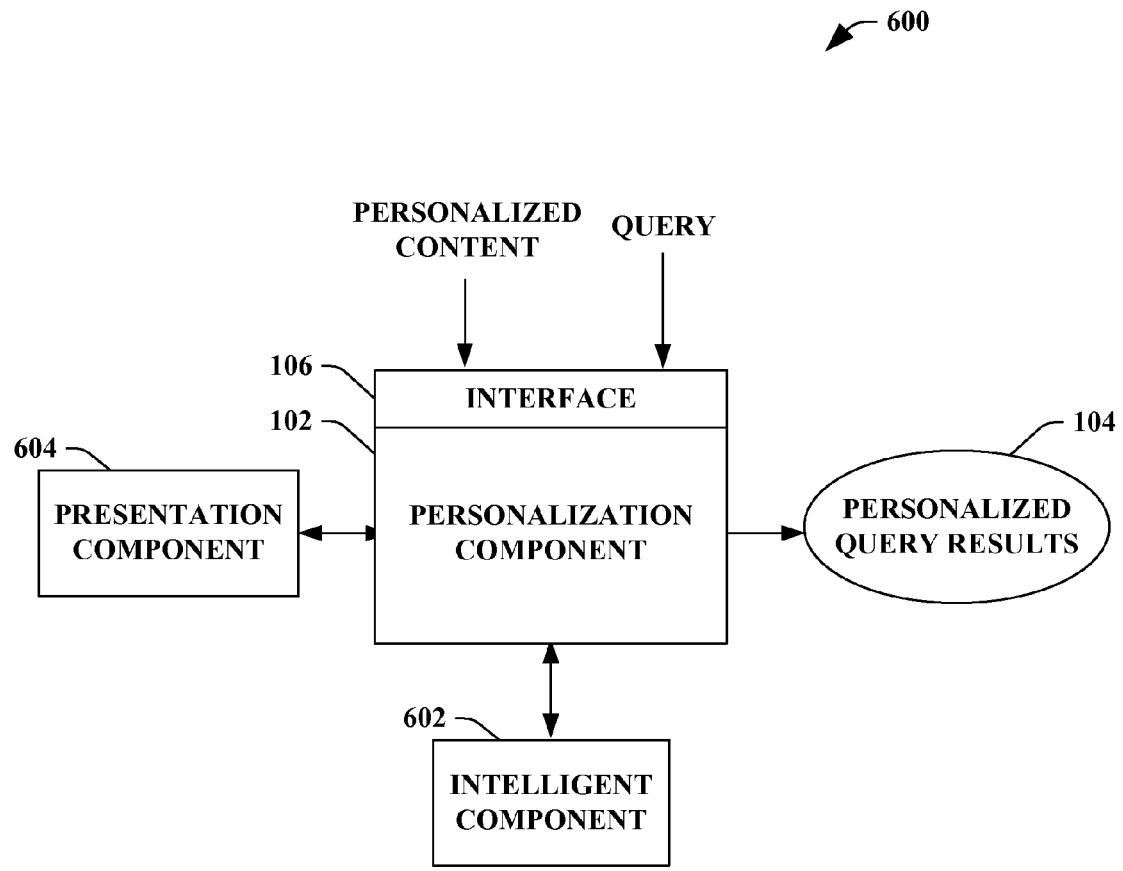
FIG. 6 illustrates a block diagram of an exemplary system that facilitates inferring relationships between users and interfacing in accordance with the subject innovation.

FIG. 6 illustrates a system 600 that facilitates inferring relationships between users and interfacing in accordance with the subject innovation. The system 600 can include the personalization component 102, the personalized query results 104, the interface 106, personalized content, and the query. It is to be appreciated that the personalization component 102, the personalized query results 104, the interface 106, personalized content, and the query can be substantially similar to respective components, results, content, queries, and interfaces described in previous figures. The system 600 further includes an intelligent component 602. The intelligent component 602 can be utilized by the personalization component 102 to facilitate automatically assigning a user to a group and identifying relevant search results based on substantially similar personalized content between group members. For example, the intelligent component 602 can infer group assignment, user interests, personalized content for evaluation, highlighting settings (e.g., emphasis technique, color, font, frequency, etc.), query expansion task session, relevant queries from group members for expansion, parallel evaluation exposure to group members, personalized score for each member, smart splitting, distribution of results to group members, group score calculation, etc.

The intelligent component 602 can employ value of information (VOI) computation in order to identify personalized search results. For instance, by utilizing VOI computation, the most ideal and/or appropriate search results can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The personalization component 102 can further utilize a presentation component 604 that provides various types of user interfaces to facilitate interaction between a user and any component coupled to the personalization component 102. As depicted, the presentation component 604 is a separate entity that can be utilized with the personalization component 102. However, it is to be appreciated that the presentation component 604 and/or similar view components can be incorporated into the personalization component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the personalization component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
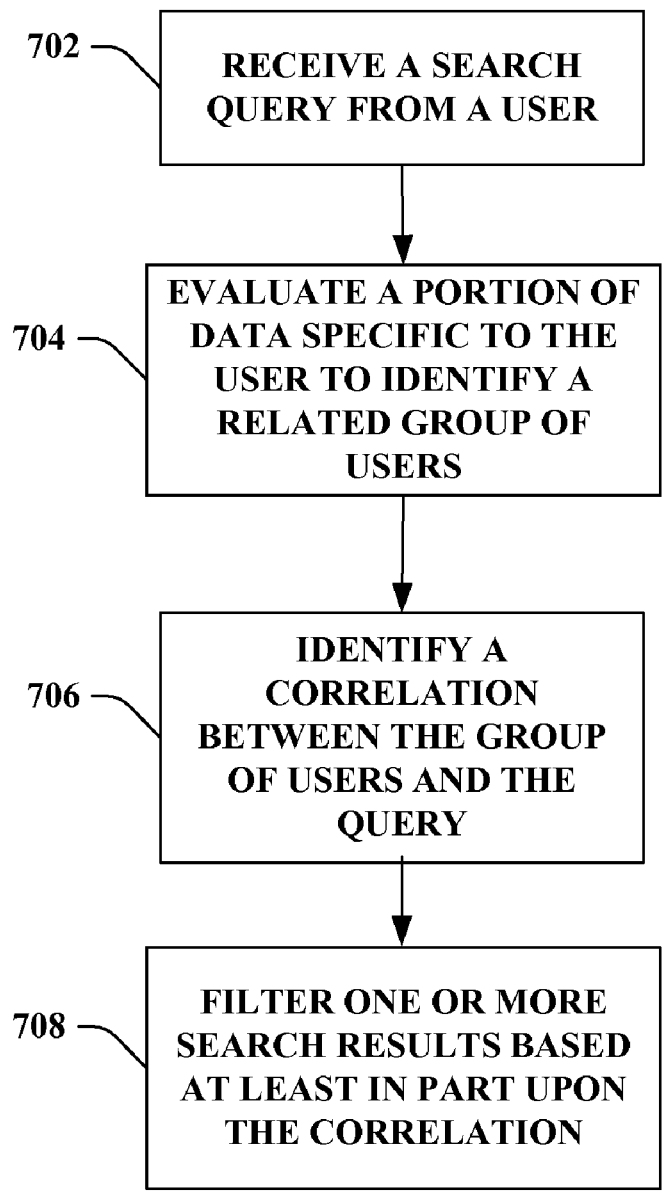
FIG. 7 illustrates an exemplary methodology for enhancing web search results by combining a user's personalized content with one or more related user's content to produce personalized results.
Figure 8:
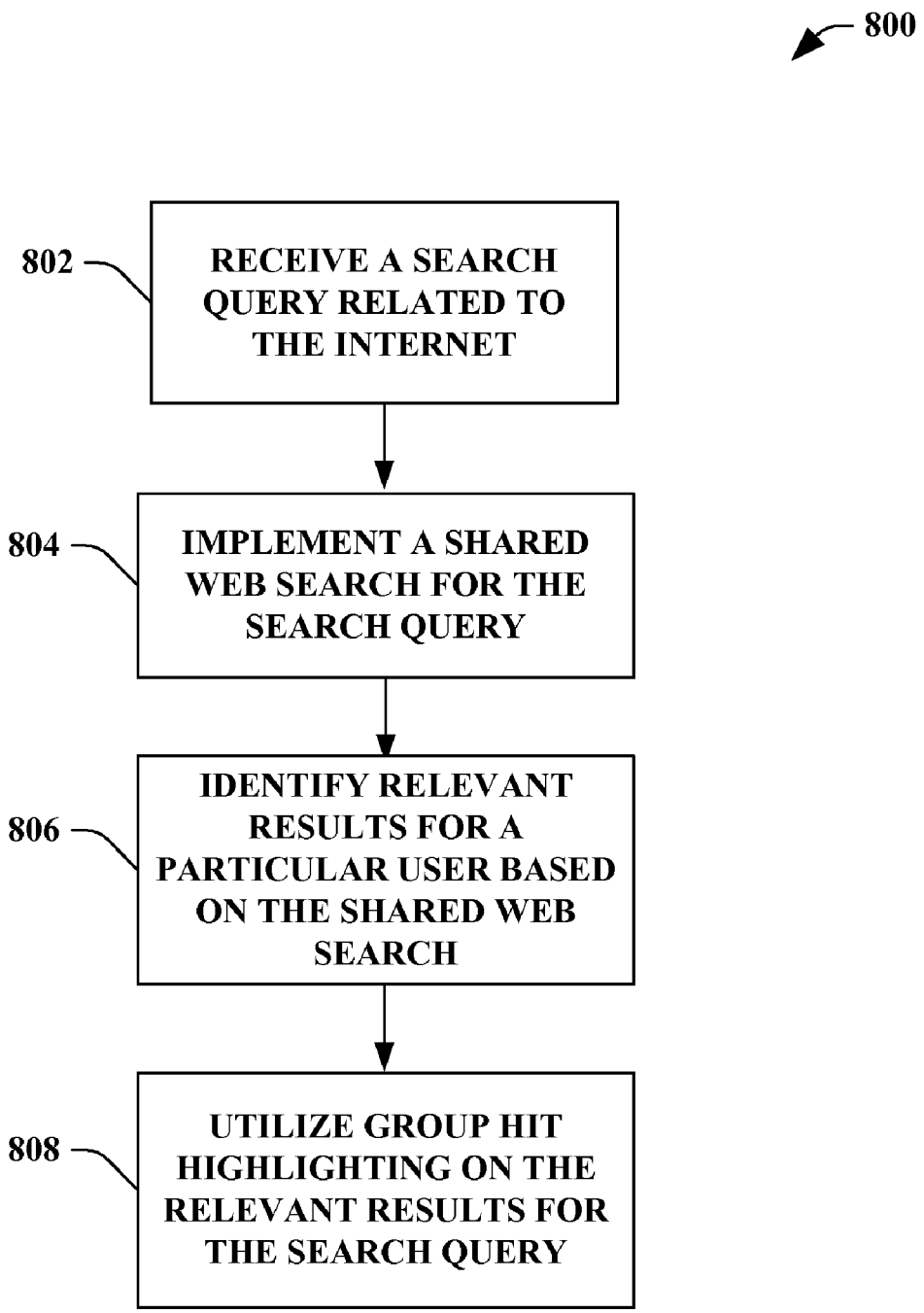
FIG. 8 illustrates an exemplary methodology that facilitates implementing a shared web task to enhance personalization of web search results.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates enhancing web search results by combining a user's personal content with one or more related user's content to produce personalized results. At reference numeral 702, a search query from a user can be received. At reference numeral 704, a portion of data specific to the user can be evaluated to identify a related group of users. For example, the portion of data specific to the user can be personalized content such as, but is not limited to being, interests, browsed content or data, history, Internet history, pages viewed, data accessed, profile, user profile, settings, websites, questionnaire, detailed questions, specific information request, shopping, purchases, any other suitable data that can identify personalized preferences or interests, etc. Moreover, the identified related group of users can be based on shared backgrounds or interests. In one example, a group of users can based on any suitable criteria or characteristic such as, but not limited to, professional data (e.g., work experience, employment, credentials, etc.), geographic data (e.g., residency, location, etc.), personal information (e.g., name, age, heritage, tax bracket, etc.), consumer data (e.g., property owned, electronic devices utilized, money produced, money spent, etc.), organizational data (e.g., membership, duration of membership, etc.), browsed data (e.g., website visitation, images viewed, media utilized, etc.), personal interests (e.g., likes, dislikes, etc.), and/or any other information that can be utilized to categorize or group two or more individuals.

At reference numeral 706, a correlation between the group of users and the query can be identified. It is to be appreciated that the correlation can be based on at least one of a groupized ranking (e.g., a personalized ranking score for a search result for each user in the group averaged to provide a groupized ranking), a smart splitting (e.g., distributed search results to users within a group for parallel evaluation), and/or a group query expansion (e.g., leveraging group member queries related to the submitted query for more breadth of results). At reference numeral 708, one or search results generated from the query can be filtered based at least in part upon the correlation.

FIG. 8 illustrates a method 800 for implementing a shared web task to enhance personalization of web search results. At reference numeral 802, a search query related to the Internet can be received. At reference numeral 804, a shared web search for the search query can be implemented. For example, the shared web search can be employed in connection with a group of users with a shared interest or related personalized content. At reference numeral 806, relevant results for a particular user can be identified based on the shared web search. At reference numeral 808, group hit highlighting can be utilized on the relevant results for the search query. In particular, the hit highlighting can employ emphasis techniques that draw attention to items (e.g., titles, URLs, snippets, etc.) within the search results based on origin of the queries (e.g., from the user or a group member).

Figure 9:
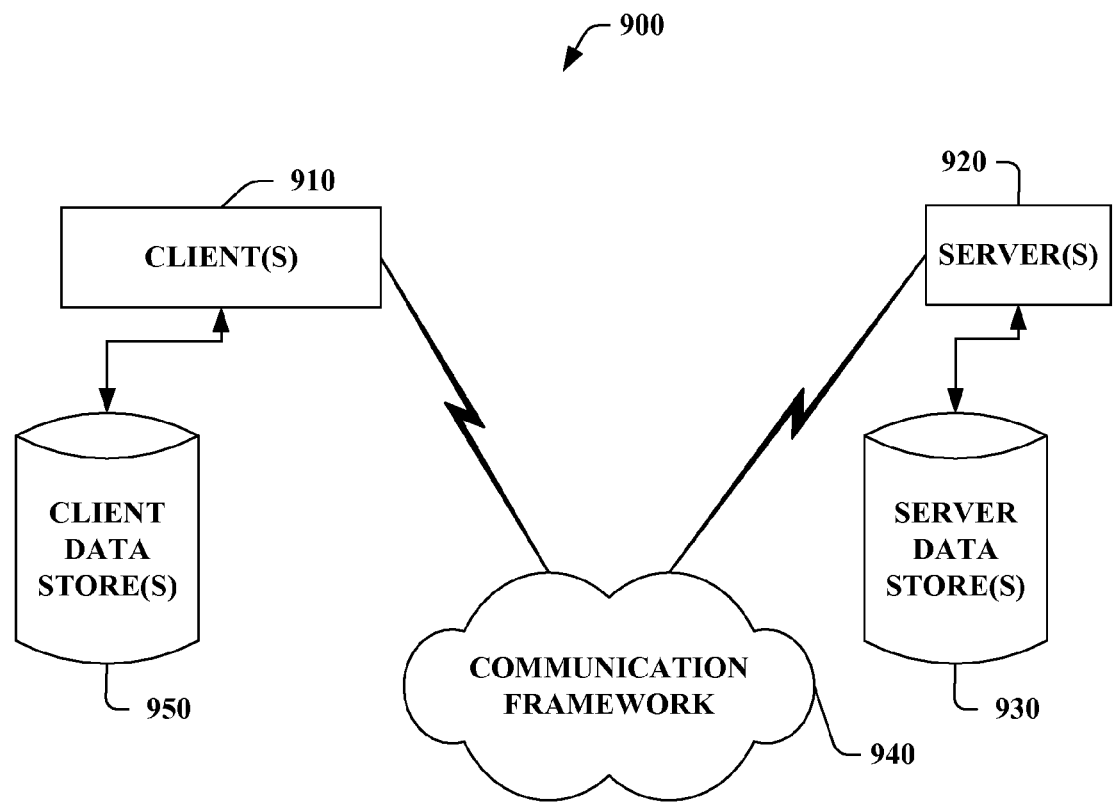
FIG. 9 illustrates an exemplary networking environment, wherein the novel aspects of the claimed subject matter can be employed.
Figure 10:
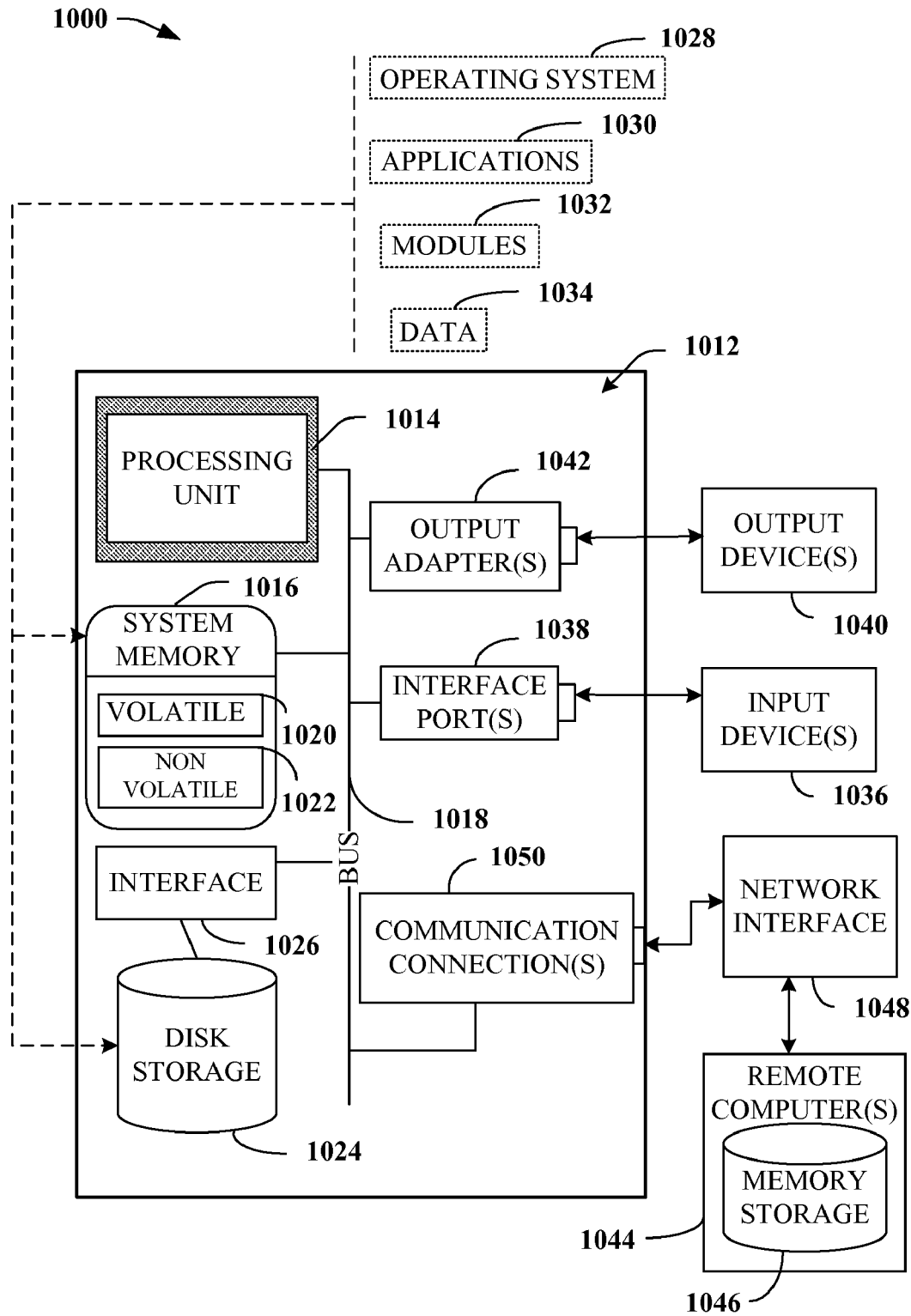
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a personalization component that facilitates combining personalized content from two or more users to enhance personalized web search results, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for generating a personalized query result for a specific user, the system comprising:
   memory;
   a processor;
   an interface stored in the memory that receives at least one of a portion of a text query to be searched or a portion of personalized content related to a user that submits the portion of the text query;
   a personalization component stored in the memory and executed by the processor that compares the portion of personalized content related to the user with a portion of personalized content related to one or more disparate users to create a group of users having group personalized content, the group personalized content is compared with the portion of the text query to identify a relationship there between to generate the personalized query result based in part on the relationship; and
   a shared web task engine that provides a collaborative web search utilizing a smart splitting technique, the smart splitting technique receives the portion of the text query and distributes query results based on the text query to members of the group to enable parallel evaluation by the members of the group, the personalized query result being generated further based in part on the parallel evaluation.

2. The system of claim 1, the personalized content relates to at least one of a background, an interest, a portion of browsed content, a portion of Internet history, a portion of a user profile, a visited website, a questionnaire, a purchase, a shared task as established by joint participation in a search using a specialized collaborative web searching tool, a portion of data related to a social networking website, a specialized group search interface, a portion of desktop content related to a machine, or a shopping history.

3. The system of claim 1, the personalized content is user specific and is at least one of local data, remote data, data on a device, or data on a computing machine.

4. The system of claim 1, further comprising a search component that generates the query results based on the text query, the query results are filtered or ranked based on the relationship of the user and the group.

5. The system of claim 1, the personalization component employs a groupized ranking by at least one of the following:
   calculating a personalization score for each member of the group and calculating a group score for each query result by combining the personalization score from each member, and re-ranking the query results based on the group score;
   computing the group personalization score from a combination of the group member's profiles and re-ranking the query results based on the group score; or
   utilizing an algorithm to combine personalization scores for members of the group into the group score.

6. The system of claim 5, the personalization score for each member of the group is based upon relevancy to the individual member and respective personalization content.

7. The system of claim 1, the query results are distributed to each member as non-overlapping subsets in which the distribution is based on a personalized score for each member.

8. The system of claim 1, the shared web task engine implements a group query expansion that expands the portion of the text query based on evaluating a text query from the group, the expansion of the text query is dependent upon having a relationship there between in which the relationship includes at least one of a semantic content, a time span of entry, or a manual inference.

9. The system of claim 8, the text query from the group is identified from a task session manually defined in at least one of the shared web task engine or the collaborative web search.

10. The system of claim 8, further comprising a highlighter component that employs an emphasis technique to a portion of the query result generated from the group query expansion search.

11. The system of claim 10, the emphasis technique is at least one of a text highlight, a magnification, a font, a bold, an underline, a pop-up, or a portion of a graphic.

12. The system of claim 10, the highlighter component utilizes a first emphasis technique for a first user and a second emphasis technique for a second user, the first user and the second user are members of the group.

13. The system of claim 1, further comprising a scope component that utilizes a confidence ranking for at least one member within the group, the confidence ranking defines a measurement of similarity between a first member and a second member within the group.

14. The system of claim 1, further comprising an edit component that enables definition of a security setting by the user for a first portion of personalized content, the security setting to allow or disallow exposure of the first portion of personalized content to be utilized to:
identify a group; and/or
identify a personalized query result.

15. The system of claim 14, the edit component allows the user to manually edit the first or a second portion of personalized content with a level of granularity to expose or allow at least one of the first or the second portion of personalized content to a first group or a first user and disallow at least one of the first or the second portion of personalized content to a second group or a second user.

16. The system of claim 1, the group being created based upon an automatic evaluation of personalized content of the user and the one or more disparate users.

17. A computer-implemented method for enhancing identification of relevant search results, the method comprising:
receiving a search query from a user, the user having personalized content that includes data specific to the user;
receiving a selection specifying a subset of the data specific to the user, the subset being specified to define which of the data specific to the user will be considered for group assignment of the user and other users to a group;
evaluating the subset of the data specific to the user to identify at least one additional user with related data there between;
creating the group including the user and the at least one additional user based in part on the evaluating and the specifying of the subset;
identifying a correlation between the user, the at least one additional user, and the search query;
generating one or more search results for the search query;
distributing the one or more search results to the at least one additional user to enable parallel evaluation by the at least one additional user; and
filtering the one or more search results based at least upon the correlation and the parallel evaluation.

18. The method of claim 17, further comprising:
aggregating the at least one additional user into the group;
providing a personalized score for each of the one or more search results for each member in the group; and
utilizing each personalized score to re-rank the one or more search results, the utilizing comprising:
calculating a group score as a sum of each group member's personalization score for each of the one or more search results; and
re-ranking the one or more search results based on each associated group score.

19. The method of claim 17, further comprising:
implementing a shared web search for the search query, wherein the shared web search comprises the user participating in a collaborative web search with the at least one additional user;
identifying relevant results for a particular user based on the shared web search; and
utilizing a group hit highlighting on the relevant results for the search query, the group hit highlighting comprising a unique emphasis technique for each user of the group.

20. A computer-implemented method for generating a query result relevant to a user, the method comprising:
receiving of a portion of a text query to be searched and a portion of personalized content items related to a user that submits the portion of the text query, the portion of the personalized content items being specified by the user to define which of the personalized content items related to the user will be considered for group assignment of the user and one or more other users to a group;
evaluating personalized content items related to at least one additional user and the user that submits the text query based in part on a relationship between the portion of personalized content items and the personalized content items related to the at least one additional user;
creating the group including the user that submits the text query and the at least one additional user based in part on the evaluating;
leveraging the group and the portion of the personalized content items to provide a search result associated with the portion of the text query by performing at least one of the following:
determining a groupized ranking by calculating a personalized ranking of the search result for each member of the group and combining the personalized ranking to provide a group score;
smart splitting by distributing the search results to the group for parallel evaluation; or
group query expansion that broadens the text query by evaluating related queries generated by a member of the group.

* * * * *